United States Patent
Epple, Jr.

(10) Patent No.: US 6,443,803 B1
(45) Date of Patent: Sep. 3, 2002

(54) TUNABLE TURKEY CALL

(76) Inventor: John Albert Epple, Jr., 3412 Woodrail Ter., Columbia, MO (US) 65203

( * ) Notice: Subject to any disclaimer, the term of this patent is extended or adjusted under 35 U.S.C. 154(b) by 0 days.

(21) Appl. No.: 09/722,948

(22) Filed: Nov. 27, 2000

Related U.S. Application Data

(60) Provisional application No. 60/172,955, filed on Dec. 21, 1999.

(51) Int. Cl.$^7$ .................................................. A63H 5/00
(52) U.S. Cl. ..................... 446/418; 446/397; 84/411 R; 84/411 M
(58) Field of Search ................................ 446/397, 418; 84/411 R, 413, 415, 416, 414, 411 M, 402, 403, 404

(56) References Cited

U.S. PATENT DOCUMENTS

| | | | | |
|---|---|---|---|---|
| 1,655,291 A | * | 1/1928 | Pichler | 446/397 |
| 3,208,184 A | * | 9/1965 | Wisor | 446/397 |
| 4,586,912 A | * | 5/1986 | Adams | 446/397 |
| 4,976,648 A | * | 12/1990 | Meline | 446/397 |
| 5,178,575 A | * | 1/1993 | Koch | 446/397 |
| 5,529,526 A | * | 6/1996 | Wesley | 446/397 |
| 5,562,521 A | * | 10/1996 | Butler et al. | 446/397 |
| 6,210,252 B1 | * | 4/2001 | Anderson | 446/397 |

* cited by examiner

*Primary Examiner*—John A. Ricci
*Assistant Examiner*—Urszula M. Cegielnik

(57) ABSTRACT

This game call is named The Tunable Turkey Call. It contains several features new to turkey calls. This game call will give its user: improved sound and amplification; the benefit of multiple tuning options for the game call; the benefit of being able to disassemble the call for repair or replacement of any of its parts; the ability for a one-handed user to use the call; and the ability to adequately use this game call for the purpose intended after a short time of practice.

This game call can be used by hunters, photographers, and bird watchers to make simulated wild turkey sounds for the purpose of attracting wild turkeys to the vicinity of the user.

This game call is comprised generally of a sound box with a rigid friction element sound pad and an opposing, stretchable membrane, a striker, and a striker weight.

2 Claims, 3 Drawing Sheets

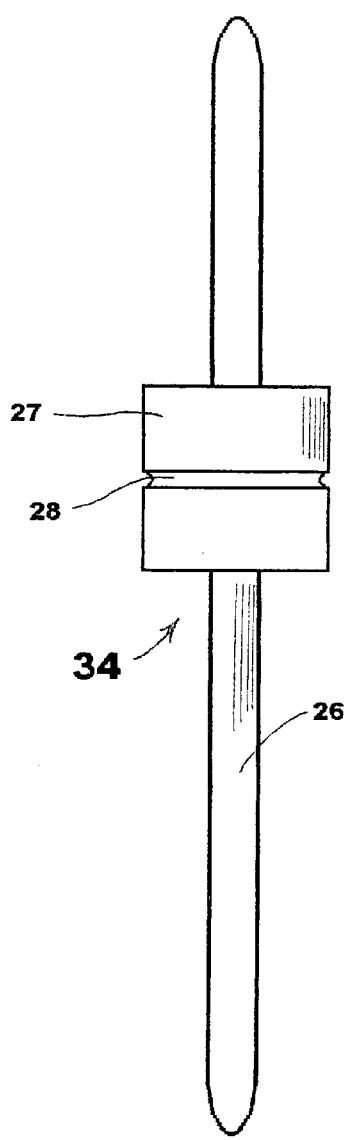
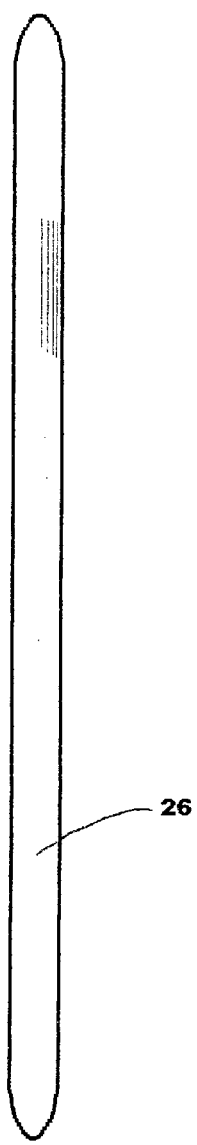
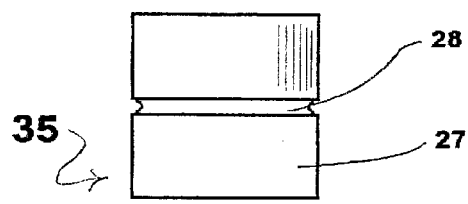
FIG. 7
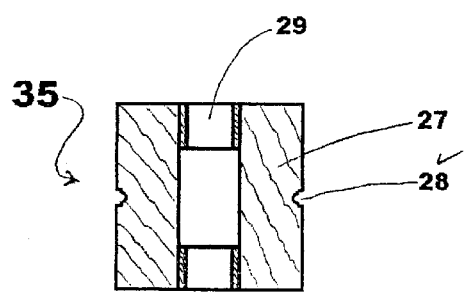
FIG. 8
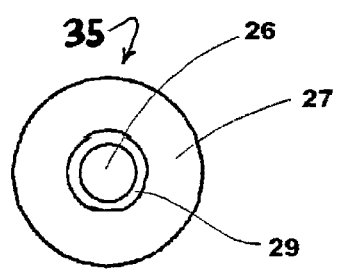
FIG. 9
FIG. 6    FIG. 10

TUNABLE TURKEY CALL

This application claims benefit of provisional application No. 60/172,955, filed Dec. 21, 1999.

PRIOR ART CITED

U.S. Patent Documents 6,210,252 B1 April 2001 Anderson 446/418
5,961,367 October 1999 Morris 446/397
5,716,254 February 1998 Bowes 446/397
5,562,521 October 1996 Butler et al. 446/397
5,529,526 June 1996 Wesley 446/397
5,178,575 January 1993 Koch 446/397
4,988,325 January 1991 Alderson 446/397
4,904,221 February 1990 Taylor 446/397
4,854,914 August 1989 White 446/397
4,662,858 May 1987 Hall 446/397
4,648,852 March 1987 Wingate 446/397
4,586,912 May 1986 Adams 446/397
4,310,986 January 1982 Jacobs 446/397
4,003,159 January 1977 Piper 46/189
3,716,943 February 1973 Orzetti 446/397
3,208,184 April 1963 Wisor 446/397
2,958,157 November 1960 Tannehill 46/177
2,643,483 June 1953 Walker 46/189

STATEMENT REGARDING FEDERALLY SPONSORED RESEARCH OR DEVELOPMENT (Not Applicable)

REFERENCE TO A MICROFICHE APPENDIX (Not Applicable)

BACKGROUND—FIELD OF THE INVENTION

This invention pertains to the field of game calls, and particularly to the field of game calls in which sounds are generated to simulate the sounds made by a wild turkey. Specifically, the invention relates to a hand-held striker for frictionally interacting with a hand-held game call, the striker and game call both having adjustable elements which may be manually adjusted to produce a plurality of different turkey sounds, thereby making it possible for a person hunting wild turkeys to attract wild turkeys with turkey sounds which are an improvement over the sounds produced by presently available game calls made for the same purpose.

BACKGROUND—DESCRIPTION OF THE RELATED ART

Game calls for producing sounds attractive to wild turkeys can be broadly defined by four classes. These are as follows.
1) Box calls, where wood is rubbed against wood to produce turkey-like sounds.
2) Diaphragm calls, where air is forced over a membrane to make it vibrate in ways which result in turkey-like sounds.
3) Suction calls, where a small tube is sucked on in a way which makes turkey-like sounds.
4) Peg calls, where a peg such as a wood dowel is rubbed across a roughened surface such as slate to produce turkey-like sounds.

Peg calls can be further classified as those where a peg is moved across a roughened surface by mechanical means, and peg calls where a peg is manually rubbed across a roughened surface.

The present invention is the type where a peg is manually rubbed across a roughened surface.

Game calls other than the present invention have distinct disadvantages for attracting wild turkeys when their sounds and operational features are compared to the present invention. One of their disadvantages is that their general tone cannot be easily changed in order to more nearly simulate the variety of sounds made by real turkeys.

Even though other game calls may be able to make several notes, those sounds are repetitiously made with the same frequency for each note of sound.

When turkeys hear the same calling sounds over and over from game calls, they soon pay no attention to those calls. During the last days of the hunting season wild turkeys become wary of the repetitive sounds of game calls. It is then that other kinds of came calls are the least useful, but the present invention, because of its numerous tuning features, can be operated to continue to draw turkeys to the user.

None of the cross-referenced game calls have a quality equaling or surpassing the present invention with respect to tunability, ease of repair, or sound. They all have significant drawbacks relative to the present invention. All these patents utilize in some way a roughened surface for a sound pad and/or a manually-operated striker None have a stretchable membrane opposite the sound pad. None are capable of having all the parts easily changeable or repairable. None have broad tuning capabilities. Other disadvantages of each are noted below.

1) U.S. Pat. No. 6,210,252 B1 does not have a handle which can be moved up or down the striker peg for the purpose of obtaining sounds of varying frequencies.
2) U.S. Pat. No. 5,961,367 does not have a handle which can be moved up or down the striker peg for the purpose of obtaining sounds of varying frequencies.
3) U.S. Pat. No. 5,716,254 uses a large cone attached to the striker and a wrist-mounted sound pad without a housing. The presence of a wrist under the sound pad will destroy the necessary resonance.
4) U.S. Pat. No. 5,562,521 uses a rigid, domed disk opposite the sound pad, and a non-adjustable handle.
5) U.S. Pat. No. 5,529,526 uses a striker having three ineffective horizontal sound chambers and a non-adjustable handle.
6) U.S. Pat. No. 5,178,575 has a striker having a non-adjustable handle.
7) U.S. Pat. No. 4,988,325 has a striker having a non-adjustable handle.
8) U.S. Pat. No. 4,904,221 includes a number of different strikers, but none of their handles are adjustable.
9) U.S. Pat. No. 4,854,914 has a rigid cover opposite the sound pad and a non-adjustable striker handle.
10) U.S. Pat. No. 4,662,858 has a rigid cover opposite the sound pad, and a non-adjustable striker handle.
11) U.S. Pat. No. 4,648,852 has a rigid cover opposite the sound pad, and a non-adjustable striker handle.
12) U.S. Pat. No. 4,586,912 has a rigid cover opposite the sound pad, and a non-adjustable striker.
13) U.S. Pat. No. 4,310,986 has no solid cover opposite the sound pad, and has a non-adjustable striker.
14) U.S. Pat. No. 4,003,159 has a rigid cover opposite the sound pad and a non-adjustable striker handle.
15) U.S. Pat. No. 3,716,943 has a rigid cover opposite the sound pad and a non-adjustable striker handle.
16) U.S. Pat. No. 3,208,184 is made to produce sound by twisting part of the call, and it does not have a changeable striker rod or adjustable striker weight.
17) U.S. Pat. No. 2,958,157 is a plain piece of slate with a simple peg striker without a resonance chamber, and the striker has no adjustable weight for producing varying frequencies.

18) U.S. Pat. No. 2,643,483 is made to produce sound by twisting part of the call, and it does not have a changeable striker rod or adjustable striker weight.

BRIEF SUMMARY OF THE INVENTION

It is the primary object of the present invention to provide an improved game call capable of producing authentic wild turkey sounds.

Another object of the present invention is to provide a game call that can produce wild turkey sounds of varying frequencies.

Another object of the present invention is to provide a game call that will provide wild turkey sounds which surpass the authenticity of sound and volume of sound produced by existing game calls.

Another object of the present invention is to provide a game call that will provide wild turkey sounds which can be easily altered or tuned at the hunting locale to suit the user.

Another object of the present invention is to provide a turkey call that is in all important respects easily capable of being repaired by the user, using readily-available parts, and common household tools.

These and other important objectives are accomplished with the turkey call comprising the present invention. The turkey call includes a striker assembly, and a striker weight assembly.

The sound box housing assembly comprises an upper portion and a lower portion between which a flexible membrane is held by clamping friction. The upper portion and the lower portion are held tightly together by removable fasteners. The upper portion has a front side with a first opening. The lower portion has a back side with a second opening. A rigid friction element is configured to be removably received in the first opening of the sound box housing assembly to form a striking surface for the turkey call. A collar member is adjustably positioned between the flexible membrane and the rigid friction element. The collar member presses upon the inner surface of the flexible membrane, and stretches it towards the second opening of the sound box housing assembly, thus creating a sound chamber within the sound box housing assembly. The collar member can be rotated so that ramped notches on one edge of the collar member slide over pins fastened removably to the inner wall of the sound box housing assembly thus regulating the amount of pressure on the inner surface of the flexible membrane, thereby providing a means of adjusting the pressure on and tension in the flexible membrane. The configuration of the rigid friction element, flexible membrane, and collar member within the sound box housing assembly forms a sound chamber much like that of a musical drum. This configuration produces turkey sounds when the striking surface of the rigid friction element is placed in moving contact with a rigid member.

The striker assembly serves as a rigid member for the purpose of making turkey sounds, but the sounds produced will have a ringing component which is uncharacteristic of turkey sounds. The ringing is reduced to a negligible amount by the use of a fabric strip held again st the inner surface of the flexible membrane by an adjustable, malleable tuning element which has one end embedded in the wall of the sound box housing assembly. The fabric strip will serve to dampen any unwanted ringing sound component. When the sound box housing assembly is initially assembled, the elongate, metal-arm, tuning element is set to provide more pressure on the fabric strip than is anticipated to be necessary, then, after the sound box housing assembly is assembled, pressure from a finger on the outer surface of the flexible membrane opposite the fabric strip and metal arm tuning element may be used to position the dampening device to its optimum pressure. If the dampening becomes too little, the sound box housing assembly can be disassembled, and the metal arm tuning element bent further towards the membrane to reinitiate maximum dampening.

The striker assembly comprises a rigid, cylindrical rod element and a striker weight assembly which can be moved up or down on the rigid cylindrical rod to alter the vibrational frequencies of the rod element when it is used to make a moving contact with the rigid frictional element for the purpose of making turkey sounds.

The striker weight assembly comprises a cylindrical block through which a hole is bored on the central axis. The hole is fitted with flexible ring elements to frictionally secure the striker weight assembly to the striker rod element. The striker weight can then be moved up or down on the striker peg to obtain varying sounds. The striker weight element may have a groove on its circumference for attaching a string tether.

BRIEF DESCRIPTION OF THE SEVERAL VIEWS OF THE DRAWINGS

The various aspects of the present invention are described in detail below, with reference to the drawings, in which:

FIG. 6 is a side view of the striker assembly.

FIG. 7 is a side view of the striker weight element.

FIG. 8 is a sectional view at the center of the striker weight element, showing its interior components.

FIG. 9 is an end view of the striker weight element.

FIG. 10 is a side view of the striker rod element.

PART NUMBERS

Part 13) (Number not used.)
Part 14) Upper portion of the sound box housing assembly body. (Wood available at wood-crafts supply stores.)
Part 15) Lower portion of the sound box housing assembly body. (Wood available at wood-crafts supply stores.)
Part 16) Flexible membrane. (Dental-dam membrane. Available at dentist offices.)
Part 17) Rigid friction element. (Available at specialty shops selling turkey call manufacturing supplies. Slate is sometimes used for this element.)

Part 18) Collar member. (Section cut from plastic pipe available at plumbing supply stores.)
Part 19) Fabric strip. (Cut from supple wool or fleece cloth. Available at fabric shops.)
Part 20) Collar member retaining pins. (Cut from stiff wire. Available at hardware stores.)
Part 21) Tuning element. (Cut from malleable, bendable wire. Available from hardware stores.)
Part 22) Thermoplastic glue. (Available from hardware stores.)
Part 23) Clamping devices. (Wood screws are shown. Available at hardware stores.)
Part 24) Friction element gasket. (Alternate use. Compressible, flexible tubing is shown. Available at hardware stores .)
Part 25) Friction element retainer. (Alternate use. Octagonal ring cut and bent from stiff, springy, flexible wire. Available at hardware stores.)
Part 26) Striker rod element. (Wood dowel is shown. Available at hardware stores.)
Part 27) Striker weight element. (Drilled wooden dowel is shown. Available at hardware stores.)
Part 28) Tether groove. (Optional. Made in woodworker shop.)
Part 29) Flexible ring element. (Cut from plastic tubing. Available at hardware stores.)
Part 30) Collar member ramps. (Triangular cut-outs in the collar member.)
Part 31) Notch for tuning element. (Rectangular notch cut in the collar member.)
Part 32) (Number not used.)
Assembly 33) Sound box housing assembly.
Assembly 34) Striker element assembly.
Assembly 35) Striker weight assembly.

The materials, shapes, size, and supplier of the parts comprising the preferred embodiment are shown as an aid to persons who wish to make the present invention after the patent expires. Any materials, shapes, size, or suppliers which will satisfactorily serve the function of the part may be used, as the materials and suppliers named are not exclusive of other materials, shapes, sizes, and suppliers.

DETAILED DESCRIPTION OF THE INVENTION

Referring to FIGS. 1–12, a preferred embodiment of the game call is generally designated.

Figure 1:
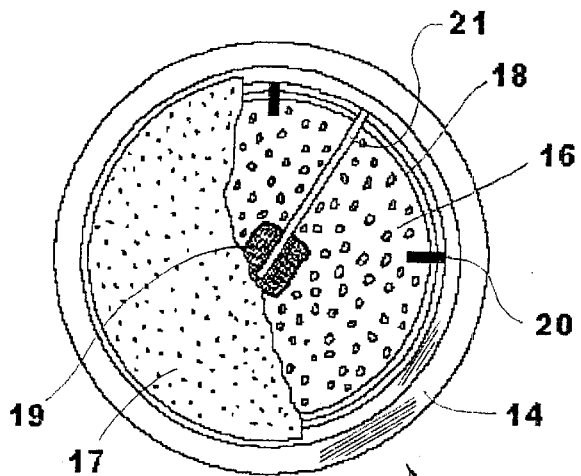
FIG. 1 is a view at the rigid friction element end of the sound box housing assembly, with some parts shown cut away to show the interior.

FIG. 1 is a view of the Rigid Friction Element 17 end of the present invention's Sound Box Housing Assembly 33, showing the Rigid Friction Element 17, a planar member which has a rough surface which will produce a turkey-like sound when brought into moving contact with a Striker Element Assembly 34, and, as revealed in a cut-away opening in said Rigid Friction Element 17: the Upper Portion 14, a cylindrical wooden tube, of the Sound Box Housing Assembly 33; the Flexible Membrane 16, a stretchable, vibratory element used for enhancing the sounds made by this game call; the Collar Member 18, a section of plastic pipe used as an adjustable spacer for creating more or less tension in the Flexible Membrane 16; the Fabric Strip 19, a piece of cloth used to dampen any overtones in the vibratory sounds produced in Flexible Membrane 16, thereby providing tuning adjustments in the game call; the plurality of Collar Member Retaining Pins 20, used to support the Collar Member 18 in its optimum position, and to serve as pins over which the Collar Member 18 can be rotated to produce greater or lesser tension in the Flexible Membrane 16 to provide tuning adjustments; and the Tuning Element 21, a malleable, bondable elongate member used to retain the Fabric Strip 19 against the Flexible Membrane 16, and further to serve to create greater or lesser tension in the Flexible Membrane 16 when the Tuning Element 21 is manually positioned with greater or lesser pressure against the Flexible Membrane 16 to provide tuning adjustments.

Figure 2:
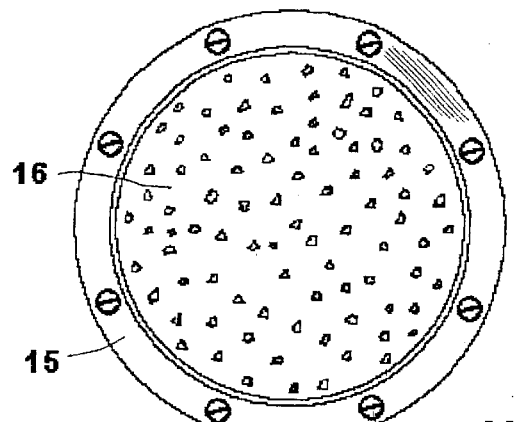
FIG. 2 is a view at the end of the sound box housing assembly opposite the rigid friction element end, showing the flexible membrane in place.

FIG. 2 is a view of the Flexible Membrane 16 end of the present invention's Sound Box Housing Assembly 33, showing: the Lower Portion 15, a cylindrical wooden tube, of the Sound Box Housing Assembly 33; the Flexible Membrane 16; and a plurality of Clamping Devices 23, wood screws used to draw the Upper Portion 14 and the Lower Portion 15 of the Sound Box Housing Assembly 33 tightly together in a clamping action.

Figure 3:
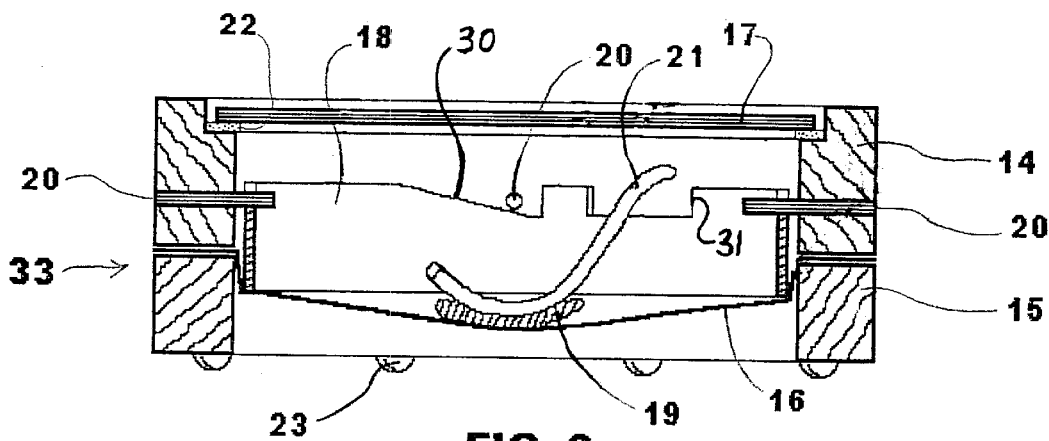
FIG. 3 is a sectional view through the center of the sound box housing assembly, showing its interior parts. In this view the rigid friction element is shown fastened in place with thermoplastic glue.

FIG. 3 shows a vertical section through the center of the Sound Box Housing Assembly 33. Several previously described parts are shown to further clarify their function and position. Shown additionally are: a bed of Thermoplastic Glue 22 which serves to secure the Rigid Friction Element 17; triangular notches forming Collar Member Ramps 30, used as previously described; and one rectangular notch 31 the Notch For Tuning Element 31, used as an opening through which the Tuning Element 21 may pass.

Figure 4:
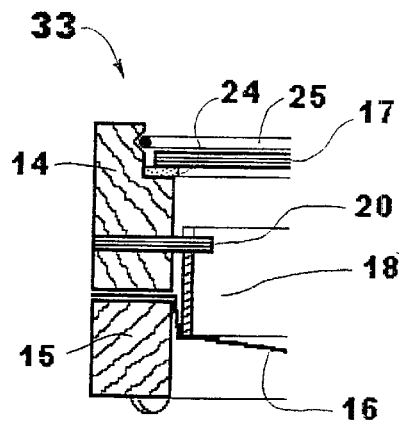
FIG. 4 is a partial sectional view through the center of the sound box housing assembly. in this view the alternate method of fastening the rigid friction element is shown to consist of a compressible gasket and a wire ring retainer.

FIG. 4 shows one edge of a vertical section through the center of the Sound Box Housing Assembly 33, and shows additionally: Friction Element Gasket 24, a ring or sections of compressible plastic tubing used as a seat cushion for Rigid Friction Element 17 when an alternate method of securing the Rigid Friction Element 17 is implemented; and the Friction Element Retainer 25, an octagonal ring made of wire, used in a slot in the Upper Portion 14 of the Sound Box Housing Assembly 33 for retaining the Rigid Friction Element in its optimum position.

Figure 5:
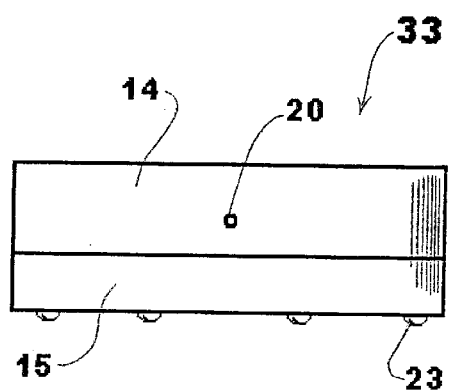
FIG. 5 is a side view of the sound box housing assembly.

FIG. 5 shows a side view of the Sound Box Housing Assembly 33.

FIG. 6 shows a side view of the Striker Element Assembly 34, including: the Striker Weight Element 27, a segment of wood dowel through which a hole has been bored at its longitudinal axis to receive the Striker Rod Element 26; the Striker Rod Element 26, a length of wood dowel with blunted ends; and the Tether Groove 28, a groove cut into side of the Striker Weight Element 27.

FIG. 7 a side view of the Striker Weight Assembly, showing the Striker Weight Element 27.

FIG. 8 a section through the center of the Striker Weight Assembly 35, showing the Striker Weight Element 27 and the Flexible Ring Elements 29. The Flexible Ring Elements 29 are segments of plastic tubing, sized to fit inside the bore of the Striker Weight Element 27, and outside the Striker Rod Element 26 in a manner which will secure the Striker Weight Element 27 to the Striker Rod Element 26, providing enough friction to prevent unintentional slippage of the striker weight assembly 35 when it is mounted on the striker rod element 26.

FIG. 9 a view at one end of the Striker Weight Assembly 35.

FIG. 10 a side view of the Striker Rod Element 26.

Figures 11, 12:
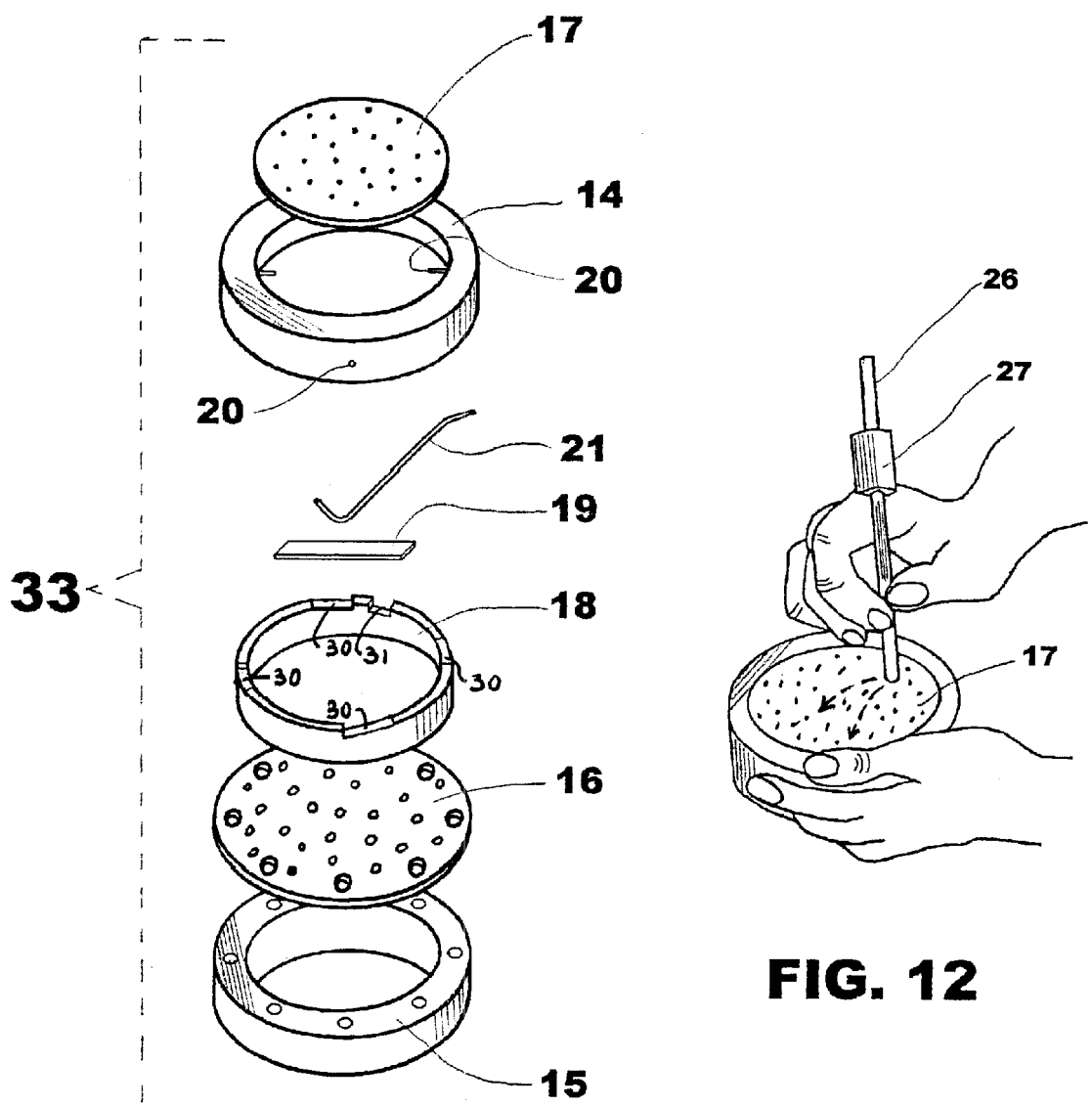
FIG. 11 is a view of the separate components of the sound box housing assembly, showing their position in the assembly.
FIG. 12 is a view illustrating the hand-held use of the striker assembly moving across the rigid friction element surface of the sound box housing assembly.

FIG. 11 a blown up view of the Sound Box Housing Assembly 33, showing its major parts.

FIG. 12 a view of the hand-held turkey call being operated.

What is claimed is:
1. A game call named Tunable Turkey Call for producing turkey sounds, the game call comprising:
a body having an upper portion and a lower portion;

said upper portion and lower portion each including a top surface;

a removable, replaceable rigid friction element mounted on the top surface of said upper portion;

a removable, replaceable flexible membrane mounted between said upper portion and lower portion;

said flexible membrane retained between said upper portion and the lower portion by friction obtained by clamping said upper and lower portion tightly together with clamping devices;

a collar member for adjusting the tension of said flexible membrane;

said collar member having its top edge restrained at the upper portion by pins;

said collar member having its lower edge restrained by the presence of the flexible membrane;

a tuning element;

said tuning element is a bendable, malleable elongate member for further adjusting the tension of the flexible membrane;

said tuning element secures a strip of fabric for dampening undesirable sound overtones; and a striker assembly.

2. The game call device of claim 1:

wherein the striker assembly includes a rod element and a weight element slidably movable on the rod element;

said weight element has a bore within;

said weight element further includes a plurality of flexible ring elements for retaining within the bore;

said flexible rings prevent the striker weight assembly from unintentional sliding; and said striker weight element further includes a fastening means for securing a tether thereto.

* * * * *